United States Patent [19]
Carey et al.

[11] 4,028,700
[45] June 7, 1977

[54] PULSE COMPRESSION RADAR AND METHOD OF OPERATING SUCH A RADAR

[75] Inventors: David R. Carey, Sudbury; Bertram J. Goldstone, Lexington; Bernard J. Thompson, Concord, all of Mass.

[73] Assignee: Raytheon Company, Lexington, Mass.

[22] Filed: Nov. 16, 1972

[21] Appl. No.: 307,287

[52] U.S. Cl. .................... 343/17.2 PC; 343/5 DP; 343/100 CL
[51] Int. Cl.² .......................................... G01S 7/28
[58] Field of Search ............ 343/17.2 PC, 100 CL, 343/5 DP

[56] References Cited
UNITED STATES PATENTS 3,680,105  7/1972  Goldstone .................. 343/17.2 PC

*Primary Examiner*—Richard A. Farley
*Assistant Examiner*—S. C. Buczinski
*Attorney, Agent, or Firm*—Philip J. McFarland; Joseph D. Pannone

[57] ABSTRACT

A method is described for improving the operation of a digital pulse compression radar by compensating for amplitude variations in the modulation signal of the transmitted pulse. In the disclosed embodiment, the contemplated compensation is effected by modifying the stored complex conjugate of the frequency spectrum of the transmitted waveform.

2 Claims, 7 Drawing Figures

PULSE COMPRESSION RADAR AND METHOD OF OPERATING SUCH A RADAR

The invention herein described was made in the course of or under a contract or subcontract thereunder, with the Department of Defense.

BACKGROUND OF THE INVENTION

This invention pertains generally to pulse compression radar systems and particularly to improvements in the manner in which echo signals may be digitally processed in the receiver of such a system.

It is well known in the art that any selected uncompressed echo signal received by a pulse compression radar may be processed in a matched filter to derive a compressed echo signal. Whether the matched filter operates in the time domain or the frequency domain, the compressed echo signal ultimately produced following any known matched filter technique is accomplished by range, or time, sidelobes. For proper operation, regardless of the amplitude of any selected uncompressed echo signal, it is then necessary to process the compressed echo signal and the accompanying range sidelobes to reduce the amplitude of the undesirable sidelobes without unduly degrading the desired compressed echo signal.

It is known that the amplitude of range sidelobes may be selectively attenuated by passing the compressed echo signal and the range sidelobes through a weighting circuit. Thus, it is known to use a conventional weighting circuit, as a Taylor or a Hamming weighting circuit, to reduce the amount of energy in the sidelobes without unduly widening the compressed echo signal. Such a technique is adequate so long as, in the frequency domain, the envelope of the signal out of the matched filter is a rectangle of constant amplitude corresponding to the familiar sin X/X distribution in the time domain.

Unfortunately, if the radar transmits a frequency modulated, or "chirp," pulse, conventional weighting techniques are not fully effective in reducing the amplitude of sidelobes. The reason for the lack of effectiveness is that the freqncy spectrum of the signal out of the matched filter only approaches a sin X/X distribution. It follows, then, that, if a weighting technique for a sin X/X distribution is applied, the sidelobes cannot be reduced as much as possible.

The difference between the frequency spectrum of the signal out of the matched filter in a pulse compression radar using a chirp pulse and a sin X/X spectrum is due to the fact that the frequency spectrum of a chirp pulse contains amplitude ripples. These perturbations, which are determined by the length of the chirp pulse and the change in frequency of the modulation signal, are sometimes referred to as "Fresnel" ripples. That is, their amplitude and frequency may be described by formulas adapted from the Fresnel diffraction formulas for light waves. The presence of Fresnel ripples is particularly detrimental when pulse compression is accomplished by digital processing including Fourier transform techniques. That is, if an uncompressed echo signal is sampled, the samples converted to digital form and passed through a Discrete Fourier transform circuit (D.F.T.) to derive the frequency spectrum of the uncompressed echo signal and then such spectrum is multiplied, point by point, by the complex conjugate of the D.E.T. of the transmitted chirp pulse, it has been found that the range sidelobes of the resulting compressed signal remain prominent and may not be adequately reduced by any conventional weighting circuit.

SUMMARY OF THE INVENTION

Therefore, it is a primary object of this invention to provide an improved digital pulse compression radar in which processing of the compressed echo pulse is accomplished in a manner that the accompanying range sidelobes may be attenuated to a large degree.

The foregoing and other objects of this invention are attained generally by providing, in the processor of a digital pulse compression radar, means for modifying the complex conjugate of the D.F.T. of each chirp pulse transmitted from the radar to compensate for the Fresnel ripples in the frequency spectrum of each such pulse. The compensation is such that when the modified complex conjugate of the transmitted chirp pulse and a selected echo signal are correlated, the envelope of resulting frequency spectrum is a rectangle of constant amplitude. Such a frequency spectrum may then be weighted in a conventional way and a compressed pulse, with extremely low sidelobes, derived.

BRIEF DESCRIPTION OF THE DRAWINGS

For a more complete understanding of this invention reference is now made to the accompanying description of a preferred embodiment of this invention as illustrated in the accompanying drawings, in which.

DESCRIPTION OF THE PREFERRED EMBODIMENT

Figure 1:
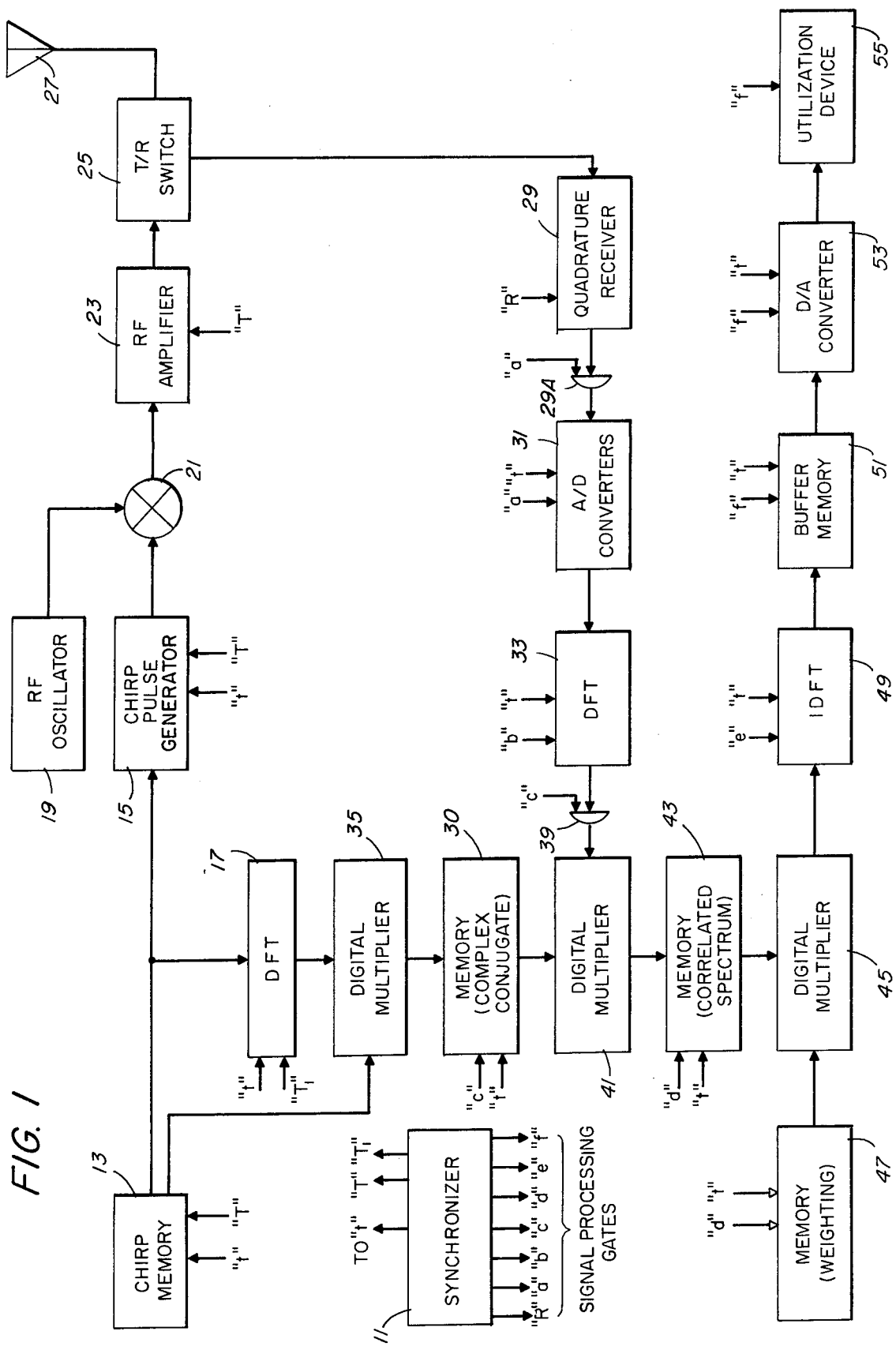
FIG. 1 is a block diagram of an improved digital pulse compression radar according to this invention, such diagram being somewhat simplified the better to illustrate a manner in which modification of the complex conjugate of the transmitted chirp pulse is accomplished.

Referring now to FIG. 1, it may be seen that the contemplated invention may be incorporated in an otherwise conventional chirp radar to eliminate the effect of Fresnel ripples in the frequency spectrum of a chirp pulse. Thus, a synchronizer 11 of any known design is provided to produce: (a) clock pulses $t$ at a rate equal to a predetermined sampling rate, i.e. at least at the Nyquist rate; (b) a transmit gate $T$ at the repetition rate of the radar; (c) a target selection gate $R$, such gate being delayed a selected period from a corresponding transmit gate $T$ to select the echo signal from a given target; and (d) signal processing gates A, B, C, D, the purpose of each one of such gates to be pointed out as this explanation proceeds. Suffice it to say here that the signal processing gates are related to the transmit gate and the target selection gate to permit transformation of the transmitted chirp signal and the selected echo signal between the time and frequency domains and correlation of such transformed signals.

Figure 2A:
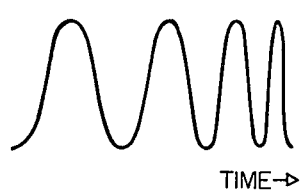
FIGS. 2A through 2F are sketches showing the waveforms, in both the time and frequncy domains, of a "chirp" pulse and the manner in which an echo signal may be processed according to the concepts of this invention.
Figure 2B:
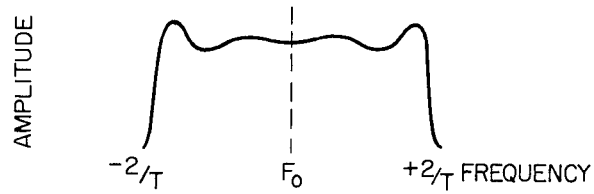

Each transmit gate T enables a read only memory (chirp memory 13) to be actuated by a set of clock pulses, $t$. The result, as is known, is that a set of complex digital numbers is produced, such set describing, in the time domain, the modulation, or chirp, pulse to be generated. Such a set of complex digital numbers is applied to both a chirp pulse generator 15 and a discrete Fourier transform circuit (D.F.T. 17). The former, for example, may be a circuit as shown and described in the copending application emitted "Improved Modulation Signal Generator and Apparatus Using Such Generator," Ser. No. 277,187, filed Aug. 2, 1972 (now U.S. Pat. No. 3,794,995 issued Feb. 26, 1974) by Bernard J. Thompson and the latter may be a circuit as shown in U.S. Pat. No. 3,686,490, issued Aug. 22, 1972, entitled "Real Time Serial Fourier Transformation Circuit" by Bertram J. Goldstone (both of which are assigned to the same assignee as this application). The chirp pulse generator 15, then, converts the set of complex digital numbers out of the chirp memory to an analog modulation signal as shown in FIG. 2A. The D.F.T. 17 processes the set of complex digital numbers out of the chirp memory to derive the discrete Fourier transform of such set, i.e. the frequency spectrum of the modulation signal, the envelope of such spectrum being shown in FIG. 2B. It will be noted that the envelope of the frequency spectrum illustrated in FIG. 2B contains Fresnel ripples in amplitude even though the envelope of the modulation signal illustrated in FIG. 2A is constant.

The modulation, or chirp, signal out of the chirp, signal out of the chirp pulse generator 15 is impressed on a ratio frequency carrier from a radio frequency oscillator (R.F. oscillator 19 by means of a mixer 21. The resulting signal is then filtered (by means not shown) and applied to a radio frequency amplifier (R.F. amplifier 23) and passed through a duplexer (T/R switch 25) to an antenna 27. The latter then propagates a modulated, uncompressed pulse of radio frequency energy in a beam to illuminate targets (not shown). Echo signals from targets at different ranges then return to the antenna 27 and are passed through T/R switch 25 to a receiver 29. The latter preferably includes quadrature channels to produce a real (or "in phase") signal and an imaginary (or quadrature) signal. The two analog channels out of the receiver feed, via AND gate 29A, analog-to-digital converters (A/D converters 31). The latter are gated by the target selection gate R to produce a set of complex digital members descriptive of the echo signal from a selected target. Such set of complex digital numbers, it will be noted, corresponds substantially to the set of complex digital numbers out of the chirp memory 13. The set of complex digital numbers out of A/D converters 31 is passed through a discrete Fourier transform circuit (D.F.T. 33) to produce the discrete Fourier transform, i.e. the frequency spectrum of the selected echo signal, the normalized envelope of such spectrum being shown in FIG. 2B. In passing, it will be noted that D.F.T. 33 may be the same as D.F.T. 17; as a matter of fact switching means (not shown) may be incorporated in the radar to permit D.F.T. 17 first to be used to drive the frequency spectrum of the transmitted modulation signal and then to derive the frequency spectrum of the selected echo signal.

Figure 2C:
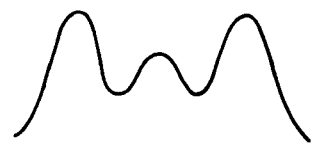

It will be observed that if the normalized frequency spectra of the transmitted modulation signal and the selected echo signal (both of which vary correspondingly in amplitude) are correlated in a conventional manner, the resulting spectrum will vary in amplitude as the product of the variations of the two original spectra. That is, if the complex conjugate of the frequency spectrum produced by D.F.T. 17 is produced by reversing the sign of the imaginary part of each complex digital number, correlation of such complex conjugate with the selected echo signal produces a freqency spectrum in which the Fresnel ripples are emphasized. By paired echo theory, then, the range sidelobes accompanying the compressed pulse in the time domain are higher than normal. To avoid such a result, it is necessary either: (a) to modify the complex conjugate to compensate for the Fresnel ripples in the transmitted and received signals; or (b) to weight the correlated frequency spectrum. It has been chosen here to modify the complex conjugate. Thus, the D.F.T. 17 is connected to a digital multiplier 35 along with a read only memory (modifying memory 37). The latter produces, for each complex digital number out of the D.F.T. 17, a multiplier in the form of a complex digital number which, when impressed on the digital multiplier 35, causes the product signal therefrom to vary in amplitude. In addition, the sign of the maginary part of the complex digital number out of the modifying memory 37 is such that the sign of the imaginary part of each digital number out of the digital multiplier 35 is reversed from the sign of the imaginary part of each digital number out of D.F.T. 17. The envelope of the frequency spectrum out of the digital multiplier 35 is shown in FIG. 2C. It will be recognized that the envelope of the frequency spectrum shown in FIG. 2C contains amplitude ripples which are opposite to the Fresnel ripples in the frequency spectrum shown in FIG. 2B. In other words, the frequency spectrum of the signal out of the digital multiplier 35 is the complex conjugate of the frequency spectrum of the transmitted chirp pulse, modified so that the amplitude ripples in such spectrum are the "mirror" images of the amplitude ripples in the original frequency spectrum. The modified complex conjugate is stored in a memory 30.

Figure 2E:
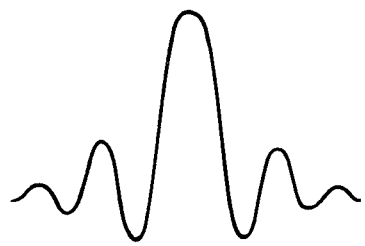
Figure 2D:

As the frequency spectrum (shown in FIG. 2B) of a selected echo signal is produced by D.F.T. 33 and passed through AND gate 39 to the digital multiplier 41, the modified complex conjugate (shown in FIG. 2C) stored in the memory 30 is also passed to such multiplier. The resulting point-by-point correlation of the two spectra then is a constant amplitude frequency spectrum (shown in FIG. 2D) stored in memory 43. Such a spectrum may be transformed to the familiar sin X/X waveform in the time domain (shown in FIG. 2E) or, as here, weighted in a digital multiplier 45 by a desired weighting factor (as a Hamming weighting function) from a memory 47 and then transformed by an inverse discrete Fourier transform circuit (I.D.F.T. 49) to produce the signal shown in FIG. 2F. It will be noted here in passing that the lengths of the main lobes of the waveforms shown in FIGS. 2E and 2F, as compared to the length of the transmitted pulse (FIG. 2A), are arbitrarily selected. In an actual embodiment compressed pulse shape shown in FIG. 2E would correspond to curve A and the compressed pulse shape shown in FIG. 2F would correspond to curve B of FIG. 25 (pages 20–29) of Skolnik's "Radar Handbook" published by McGraw-Hill Book Company, New York, N.Y. (1970).

Figure 2F:

The signals out of the I.D.F.T. 49 (which signals, it will be recognized, are successive samples in digital form of the waveform shown in FIG. 2F) are fed to a buffer memory 51 and then to a digital-to-analog converter (D/A converter 53). The analog signal out of the latter is then applied to a utilization device 55, as a conventional cathode ray tube.

It will be observed that the illustrated and described processing method is, after correlation is effected in the digital multiplier 41, conventional. This is so because the frequency spectrum represented by the set of complex digital numbers derived by the digital multiplier 41 is uniformly weighted. It is not, however, essential to the contemplated method that this be so. Thus, if the digital multiplier 35 is arranged to operate on the set of complex digital numbers out of the D.F.T. 17 to derive a set of complex conjugates in the normal way (by reversing the sign of the imaginary part of each such number) the frequency spectrum represented by the set of complex digital numbers out of the digital multiplier will not be uniformly weighted. As a matter of fact, such frequency spectrum will contain amplitude ripples which are twice the magnitude of the amplitude ripples in the frequency spectrum of the transmitted (or received) signal. It follows, then, that if it is desired to reduce range sidelobes of the finally derived compressed pulse, it is necessary to modify the weighting function applied to the set of complex digital numbers out of the memory 43. Knowing the amount of amplitude ripple in the frequency spectrum to be modified, the requisite modification of the weighting function may be incorporated in the set of complex digital numbers in the memory 47 or, alternatively, stored in a separate memory.

Having described our invention with particular reference to one embodiment and having indicated an alternative way in which the contemplated method may be applied using conventional techniques, it now will be apparent to one of skill in the art that our invention may be modified without departing from our inventive concepts. It is felt, therefore, that our invention should not be restricted to its disclosed embodiment, but rather should be limited only by the spirit and scope of the appended claims.

What is claimed is:

1. In a pulse compression radar wherein an uncompressed transmitted chirp pulse and a selected uncompressed received chirp pulse are digitally processed in the frequency domain, the method of correlating such chirp pulses comprising the steps of:
    a. deriving a first set of complex digital numbers representative of a first frequency spectrum corresponding to the frequency spectrum of the uncompressed transmitted chirp pulse, such spectrum containing amplitude ripples;
    b. weighting each one of the complex digital numbers in the first set to derive a corresponding second set of complex digital numbers representative of the complex conjugate of the first spectrum modified to contain amplitude ripples equal and opposite to the amplitude ripples in the first spectrum;
    c. storing the second set of complex digital numbers;
    d. deriving a third set of complex digital numbers representative of the frequency spectrum of the selected uncompressed received chirp pulse; and,
    e. multiplying the second and third set of complex digital numbers to derive a fourth set of complex digital numbers representative of a uniformly weighted frequency spectrum corresponding to a compressed received chirp pulse with range sidelobes.

2. The method as in claim 1 having the additional step of weighting the fourth set of complex digital numbers to taper the uniformly weighted frequency spectrum.

* * * * *